June 23, 1970  R. F. STRAUSS  3,516,772
OPAQUE LIGHT SOURCE

Filed Nov. 3, 1967  2 Sheets-Sheet 1

INVENTOR
ROBERT F. STRAUSS

BY
*Irving Kayton*
ATTORNEY

June 23, 1970   R. F. STRAUSS   3,516,772
OPAQUE LIGHT SOURCE

Filed Nov. 3, 1967                                2 Sheets-Sheet 2

INVENTOR.
ROBERT F. STRAUSS

United States Patent Office 3,516,772
Patented June 23, 1970

3,516,772
OPAQUE LIGHT SOURCE
Robert F. Strauss, Morris Plains, N.J., assignor to
Astrosystems International, Inc.
Filed Nov. 3, 1967, Ser. No. 680,398
Int. Cl. F23r 1/00
U.S. Cl. 431—158                                15 Claims

ABSTRACT OF THE DISCLOSURE

Combustion temperatures are increased and light output enhanced in a light source using an opaque tubular combustion chamber of refractory material; burning gases are caused to flow around a rod inside the chamber as the gases pass to an exhaust nozzle.

BACKGROUND OF THE INVENTION

Field of the invention

This invention relates to a light source for producing intense illumination over a large area by introducing into, and igniting in, an elongated combustion chamber having an exhaust port, a combustible mixture capable of producing intense heat within the chamber. More particularly, this invention relates to means for increasing the intensity of the light produced by such an incandescent light source beyond that which has heretofore been possible, and also for extending for a greater period of time than has been thus far possible, the duration of the illumination so produced.

DESCRIPTION OF THE STATE OF THE ART

In a co-pending application, of common assignee herewith, Ser. No. 548,272, filed May 6, 1966, now Pat. No. 3,393,967 by Fleishman and Evans, entitled Light Source, there is described and claimed a light source capable of illuminating large land areas under airborne vehicles and adapted for simple, efficient mounting in and operation from the aircraft. The illumination of interest in that application, and in this, is that portion of the electromagnetic wave spectrum visible to the human eye, i.e., luminous flux, a quantity measured in lumens.

With the exception of lasers, all light sources produce significant amounts of invisible radiation. Lasers, on the other hand produce highly focused beams not readily adapted to producing the large land area illumination from aircraft of interest herein. Visible light sources that can illuminate large areas should provide as large a ratio of visible radiation to total radiation produced as possible under the circumstances—and such a ratio is a figure of merit.

Two basic mechanisms exist for producing light. The first is by heating a material to an incandescent state, i.e., one in which it will glow with a white color. Such processes are heavily temperature dependent. The second is by applying sufficient energy to an atom or a molecule to cause a transition of its electron or electrons to an energy state higher than its normal, or rest state. This process is not necessarily temperature dependent.

The incandescent mechanism is termed continuous emission because the resulting radiation covers a wide spectral region without interruption, the length and intensity variation of which is a function of the source temperature. The common light bulb is one example of a continuous emitter. The electron excitation mechanism is termed discrete emission because it is confined to a relatively narrow portion of the spectrum. It can be triggered by other electromagnetic radiation (including thermal, i.e., infrared) or by electrical energy as in an arc discharge, e.g., the electrically energized, discretely emitting, xenon arc lamp. The conventional pyrotechnic flare provides light by a combination of these two mechanisms, i.e., discrete emission from thermally activated combustion gas constituents and continuous emission from hot solid particles generated by the combustion process or carried in the gas train or plume.

A light source for use as an aircraft-borne device for large area illumination should advantageously have several basic characteristics. If light is produced in whole or in part by incandescence, the source should be capable of operation at very high temperatures since, in general, the higher the temperature the greater the ratio of visible radiation to total radiation produced; moreover this ratio is a monotonic, non-linear, increasing function of temperature (although the ratio in percent cannot exceed 30% no matter how high the temperature because of the narrow range of the visible region compared to the infrared). The source should be self-contained and of reasonably small size for efficient airborne operation and handling. It should be capable of being focused so that application of the illumination to the area of interest may be achieved. It should have a high operating efficiency (a parameter not independent of the preceding factors). Most importantly, it must be capable of safe operation.

The electrical-filament continuous-emitting light bulb, the gas discharge arc lamp and the pyrotechnic flare are prior art that meet some of these requirements in varying degrees, but none achieve all of them.

An analysis of the pyrotechnic flare capability shows that it operates at an average combustion temperature approaching 4000° F. which is somewhat low for light applications; in addition some temperature is lost as the combustion products expand and cool. This light loss is offset somewhat by the resulting large plume surface; but this in turn leads to another disadvantageous feature— the inability to collect and focus any significant fraction of that emission upon the area of interest. In addition the open flame of the flare source makes aircraft carry unsafe during flare operation thereby limiting its tactical use to situations in which parachute suspended light point sources can be effective.

The electric powered xenon arc lamp and the metallic filament bulb provide relatively intense sources of focusable light (temperatures up to 5200° F.). In almost all respects the assets and liabilities of these sources run counter to those of the pyrotechnic flare. The electric lamp is a small source, it is focusable, it is not droppable in most instances, and its duration is relatively long compared to the flare. The major disadvantage of the lamp system is its weight and size—the major asset is its intensity and focusability. The electrical light system is thus limited to situations in which a large aircraft can be deployed to carry a rather inefficient system which is not, basically, self-contained.

In order to overcome the drawbacks selectively applicable to the various conventional prior art sources it was necessary to provide a new source which is as hot as a filament source but larger than an electric source, more self sufficient in operation than the electrical system, safer to carry than an open flame system but as efficient in operation as that system. The Fleishman et al. application is directed to such a new source. That source comprises an optically transparent chamber or envelope, preferably of fused quartz. Fused quartz is capable of withstanding intense heat, over 4500° F., without starting to boil (at pressures above atmospheric pressure) during the requisite operating period of the light source. The envelope may be, in one form, a tube or cylinder with a tapered exhaust nozzle at one end for combustion gases to escape. At the other end a fuel and oxidizer capable of producing intense heat, e.g. above 4000° F., is introduced and ignited. As a consequence the combustion products within the chamber may be heated to incandescence as may the inside wall of the envelope, and the visible light produced thereby transmitted through the transparent wall of the quartz tube. Moreover, materials may be introduced into the combustion chamber, i.e., the envelope, to further increase spectral emissivity in the visible region. Such materials may be discrete emitters; in one form they may be one or more metallic oxides deposited on the inner surface of the combination chamber with the result that the enhanced light output may also be transmitted through the transparent tube wall.

In such a light source, not only will light be transmitted through the optically transparent window, but so also will heat, especially infrared radiation. Since the visible to total radiation ratio is a direct function of temperature, other things being equal, it was considered desirable to reduce this external heat loss relative to the effective visible light output of the source for a given total energy input. Using this theoretical approach, visible light enhancement was obtained in the invention of Stanley Lehrer for Incandescent Light Source, Ser. No. 655,025 filed July 21, 1967 of common assignee herewith. This enhancement was provided in a Fleishman et al. light source by, for example, inserting a rod or pintle into the combustion chamber to extend along at least part of the envelope axis parallel to the combustion gas flow. The decrease in cross-sectional area resulting from insertion of the pintle necessarily causes an increase in the combustion gas flow rate per unit cross sectional area through the envelope; this results in increasing the surface coefficient of heat transfer along the inside surface of the combustion chamber. As a consequence, heat transfer normal to the surface, i.e., out of the light source, is increased. The inner surface temperature increase thus provided increases the visible to total radiation ratio provided and the total amount of visible radiation.

The light sources thus provided are particularly effective for large land area illumination in photographic applications wherein long duration of the intense light is not a compelling requirement. Because the operating temperatures cause ablation of the quartz tubes, these tubes are expendable and are expected to fail after large amounts of quartz are dissipated.

For some aircraft illumination purposes longer duration of operation is desirable. Moreover, excellent as may be the visible illumination provided, increased intensity and therefore greater illumination is always desirable and sought after.

It is the object of this invention therefore to provide a light source of greater intensity than heretofore available and operative over longer periods than thus far possible, while still retaining the other advantages of the devices in accordance with the aforementioned Fleishman and Evans invention.

SUMMARY OF THE INVENTION

The short lived operation of the quartz light source in the art has been viewed as offset by its transparency. A transparent combustion permits the exit of the visible light generated within the chamber by the discrete emitters, such as metallic oxides, which may be incorporated therein, or by the continuous emission provided by greybody radiation such as from the pintle described in the aforementioned Lehrer application. Moreover, the incandescence of the inner surface of the quartz chamber itself, although eventually resulting in rupture of the chamber through ablation, also provides a useful visible light output because of the chamber transparency.

The 4500° F. melting point of quartz (and the 5200° F. melting point of sapphire, $Al_2O_3$, which appears to be the only other practical transparent material for such a light source), however, constitutes an upper limit on light intensity output. In accordance with the principles of the invention, therefore, it was discovered that using a chamber albeit opaque, which could be operated at temperatures well above the maximum possible for the transparor impregnate the outside surface to enhance illuminathrough its own incandescence, although as a continuous emitter, could provide a long lasting chamber of even greater intensity than the transparent chamber. An opaque refractory material such as graphite which has a melting point of 6600° F. may be heated to and maintained at 6000° F. or more without ablation or melting and provides a consequent increase in intensity output for long duration. Moreover, because the problem of structural failure of the chamber is coped with, larger sized chambers may be used and greater light output provided by virtue of size alone.

Even the light enhancement of discrete emitters need not be lost with the opaque refractory combustion chamber. Since the entire refractory chamber, outside surface as well as inside, is heated to and maintained at incandescence, discrete emitting materials may be coated on or impregnate the outside surface to enhance illumination. The structural integrity provided by the refractory chamber allows its use as the outermost envelope of the light source, thus eliminating the need for any visible light reducing structural members between the incandescent portions and the object to be illuminated. On the other hand the use of an outer transparent envelope within which the opaque chamber may be housed provides additional advantages. Thus, if discrete emitting material is disposed on the outside surface of the opaque chamber, oxidization of the discrete emitting material (or of the graphite or other opaque refractory material if not covered with light enhancing material) is substantially eliminated by enclosing the opaque chamber within the transparent envelope. Since oxidation of these surfaces decrease light output, its prevention is advantageous.

BRIEF DESCRIPTION OF THE DRAWINGS

For a better understanding of the present invention, together with other and further objects thereof, reference is made to the following description taken in connection with the accompanying drawings. In the drawings.

DESCRIPTION OF THE PREFERRED EMBODIMENT

Figure 1:
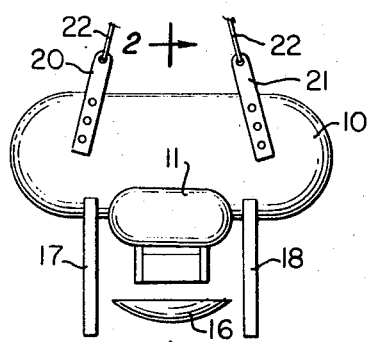
FIG. 1 is a side view of a lamp housing mounted below fuel and oxidizer tanks.
Figure 2:
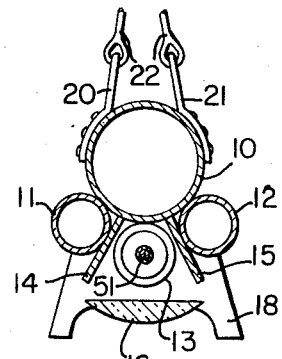
FIG. 2 is a cross sectional view of the arrangement shown in FIG. 1 and is taken along line 2—2 of that figure.

Referring now to the drawings, FIG. 1 shows a large tank 10 which may hold an oxidizer such as gaseous or liquid oxygen. Mounted below tank 10 is a second tank 11 which holds a fuel, either gas or liquid such as JP-4. A third tank 12 may be mounted on the other side of the assembly and may hold other gases or fluids such as nitrogen for pressurizing the liquid fuel or visible light enhancing fluids, or both. The light source 13 itself is mounted directly below tank 10 and may be positioned between two reflectors 14 and 15. The reflectors help to intensify the light directed downwardly and they form a barrier which prevents the light source 13 from illuminating the airborne vehicle which is supporting the source. A lens 16 may be mounted below the reflectors, but this is not always necessary and may be omitted. Two or more supports 17 and 18 may be secured to the tank 10 for supporting the arrangement on the ground prior to being airborne. One or more brackets 20 and 21 are secured to the tank 10 for support by cables 22 when the device is lowered from an airplane or helicopter during flight.

Figure 3:
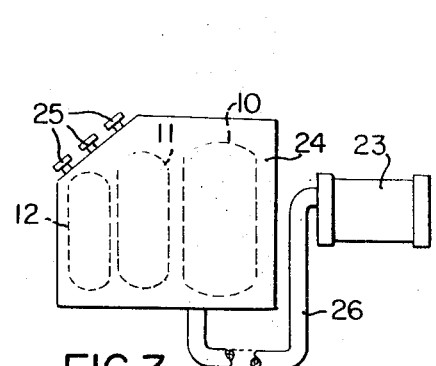
FIG. 3 is an alternate form showing a tank container and a control unit mounted exterior to the lamp which is connected to the control unit by a long supply cable.

FIG. 3 shows the preferred arrangement whereby a light source 23 is provided with cables 22 with three tanks 10, 11 and 12 housed within a compartment 24 having a control panel 25 for operation by an operator within the aircraft. The housing 24 is supported in the aircraft and is connected to the light source 23 by means of a cable 26, this cable including flexible conduits for transmission of the fluids and an electric transmission line for providing the spark plug with electrical energy for igniting the gas mixture.

Figure 4:
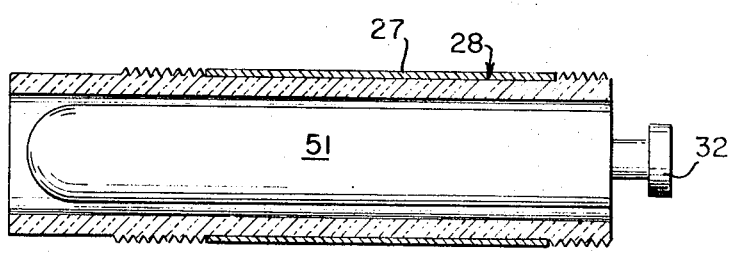
FIG. 4 is a cross sectional view of a portion of the light source envelope showing a refractory envelope with an auxiliary external layer of light producing substance, and a rod or pintle inside the combustion chamber envelope.

FIG. 4 shows a combustion chamber or envelope in the form of a cylinder 28 of refractory material such as graphite with an added layer of discrete emission material which gives added brightness to the exterior surface of the cylinder when heated to the appropriate temperature. This additional layer 27 may be quite thin and coated on the refractory material in any of several ways depending upon which discrete emitter is used and which refractory material is used. One such material is calcium oxide which gives a brilliant white light when heated to its emissive temperature. Many other materials, including barium oxide, sodium oxide, cerium oxide and thorium oxide, are available for deposition on the outside surface of the cylinder. Some of these oxides produce a color which is predominant in other spectral emission regions. Other discrete emitters that may be used are listed in Table 1 immediately below in decreasing order of output brightness (as determined by the parameter $\bar{e}_v/(e_t)1.82$, where $\bar{e}_v$ is average emissivity in the visible spectral region, and $e_t$ is total emittance).

TABLE 1

| Material: | $\bar{e}_v/(e_t)1.82$ |
|---|---|
| (1) Tungsten (W) | 6.38 |
| (2) Tantalum carbide (TaC) | 5.59 |
| (3) Niobium boride ($N_bB_2$) | 4.90 |
| (4) Tantalum | 4.55 |
| (5) Zirconium nitride (ZrN) | 2.85 |
| (6) Zirconium carbide (ZrC) | 2.65 |
| (7) Tungsten carbide (WC) | 2.56 |
| (8) Zirconium boride ($ZrB_2$) | 2.37 |
| (9) Titanium boride ($TiB_2$) | 1.90 |
| (10) Tafnium oxide ($HfO_2$) | 1.34 |

The refractory material for cylinder 28 is preferably of graphite whose significant properties are specified in Table 2 as are those of other refractory materials that may be advantageously used. Since the higher the melting point and the thermal conductivity the greater will be the light intensity output, graphite clearly leads the field.

TABLE 2.—HIGH TEMPERATURE SOURCE PROPERTIES

| Material | Symbol | Density, g./cm.³ | Melting point, °F. | Thermal conductivity cal./cm. sec./° C |
|---|---|---|---|---|
| Graphite | C | 1.8 | 6,600 | 0.250 |
| Silicon carbide | SiC | 3.2 | 4,600 | 0.244 |
| Titanium carbide | TiC | 4.9 | 5,900 | 0.058 |
| Zirconium carbide | ZrC | 6.7 | 6,100 | 0.049 |
| Titanium boride | $TiB_2$ | 4.5 | 5,400 | 0.058 |
| Zirconium boride | $ZrB_2$ | 6.1 | 5,500 | 0.058 |

Disposed along and coaxial with the longitudinal axis of envelope is graphite rod or pintle 51 in the manner disclosed and claimed in the copending application of S. Lehrer of common assignee herewith, entitled Incandescent Light Source, Ser. No. 655,025, filed July 21, 1967. The rod in this embodiment is shown solid and in any transverse cross-section the external circumference of rod 51 is concentric with the internal circumference of combustion chamber envelope 28. Clearly a hollow graphite rod may be used and is sometimes desirable because of ease in fabrication and saving in weight. The advantageous operation of a pintle in enhancing light output is for reasons to be explained below in detail.

Figure 5:
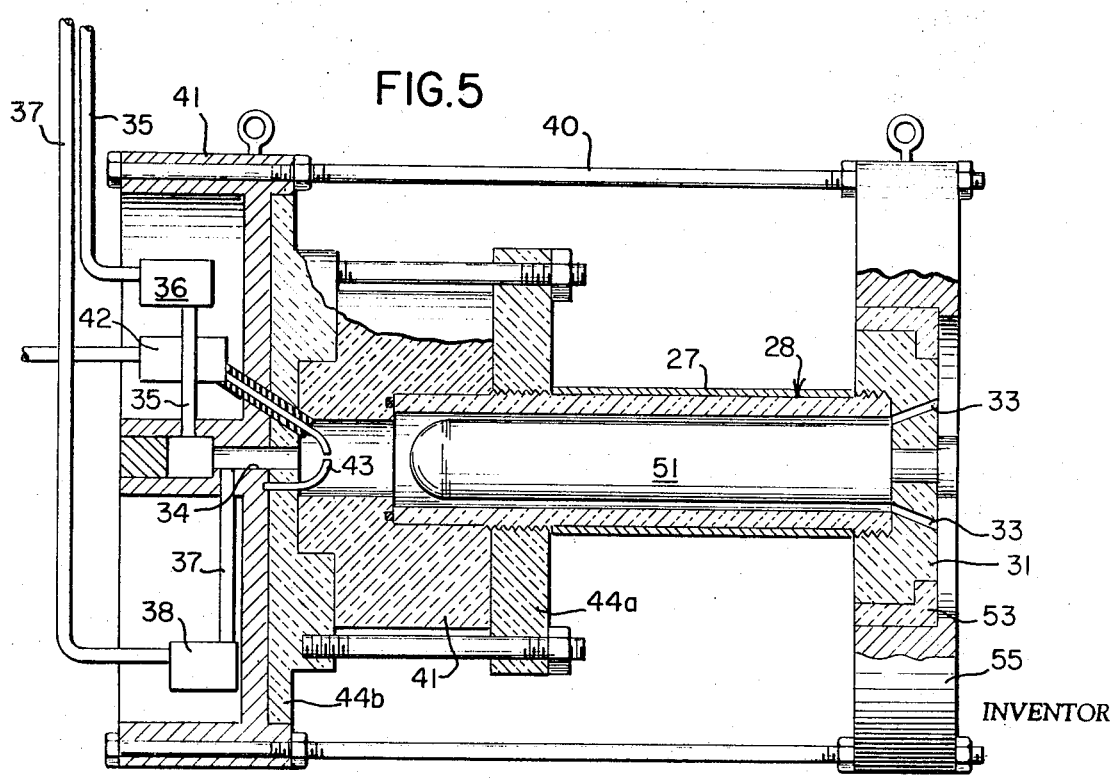
FIG. 5 is a cross sectional view showing the details of the refractory combustion chamber with the pintle mounting.

Referring now to FIG. 5, the detailed construction of the light source is shown. The refractory cylinder 28 is shown with a layer 27 of discrete emission material either coating or impregnating the outside surface of the cylinder. The exit end of the tube 28 is threaded into a surrounding block of graphite 31 forming a downstream support flange containing a plurality of output nozzles 33 disposed circumferentially about pintle 51 which permit the burned compounds to escape into the atmosphere. Concentrically surrounding flange 31 are phenolic insulation washer 53 and stainless steel flange 55. At the other end of the tube 28, a graphite block 44a forms an upstream threaded support flange. A phenolic combustion chamber 41 surrounds and butts against the end of tube 28 with appropriate seals thereat. Flange 44b which also serves as a housing for the solenoid valves and mixing chamber, is located on the other side of phenolic section 41 and may be of refractory material such as graphite or tantalum—tungsten alloy; it may also be of stainless steel for better structural support. Housing 44b is clamped to flange 55 by suitable means such as bolts 40. The graphite pintle 51 is rounded at its left hand end to provide for smooth flow of combustion gases over it as they flow from left to right through combustion chamber 28. The right hand end of pintle 51 is firmly supported in a receiving aperture in block 31 and secured with threaded graphite nut 32. The mixing chamber 34 is connected by a first conduit 35 to a tank containing fuel fluid. A solenoid valve 36 is mounted in series with conduit 35 so as to open or close the supply line to the mixing chamber. In a similar manner, conduit 37 supplies the oxidizing fluid to the mixing chamber in series with a solenoid operated oxidizer valve 38.

Appropriate seals, not all of which are shown, are provided, in manner well known to those of skill in the art, to prevent the escape of combustion gases. These may be located for example, in, on, and between flanges 31, 44a and 44b and their respective contact zones on tube 28 and phenolic section 41.

The operation of this type of light source is as follows: after being lowered from the aircraft, the valves 36 and 38 are opened by remote control and a mixture of inflammable gas delivered to the region defined by the inner-surface of chamber 41. At this point current is applied to the high tension coil 42 and the spark electrode 43 and a spark jumps across the gap to ignite the combustible mixture in chamber 41 which passes into tube 28. The flame raises the temperature of graphite tube 28. The burned gases pass around and along pintle 51 and then are ejected through the exit nozzles 33. This flow of burning gases and the action of the pintle raises the temperature of graphite tube 28 sufficiently to produce incandescence of the tube and a brilliant white light may thereby be applied to any large land area. The temperature of the tube at its outside surface may be above 6000° F. and thus the emissive layer 27 also contributes to the visible light output with its discrete emission.

The advantageous operation of pintle 51, as was disclosed in the aforementioned Lehrer application, Ser. No. 655,025, is due to its effect on the heat radiated away from the inner surface of envelope 28. For a given gas temperature the only effective way, from a light enhancement viewpoint, to drive the inside surface of the graphite envelope 28 to higher temperatures is to increase the gas side coefficient of heat transfer. The equation for the heat transfer coefficient is:

$$h_c = 584 \frac{g^{0.8}}{d^{0.2}} \text{B.t.u./hr./sq. ft./°F.}$$

where $g$ is the flow rate per unit cross sectional area (1b/sq. in./sec.), $d$ is the passage diameter (inches). For a flowrate of 0.5 lb./sec. and a diameter of 5 inches (an actual dimension in one reduction to practice), then:

$$h_c = 584 \frac{0.5^{0.8}}{5.0^{0.2}} = 22.5 \text{ B.t.u./sq. ft./hr./°F.}$$

This figure may readily be increased by a decrease in cross-sectional area or a decrease in $d$, something which is easily done by inserting pintle 51 in envelope 28. The gas flow passage then is annular. For annular passageways $d$ is replaced by an equivalent diameter $d_e$ which equals the difference in the diameters of the inside of the graphite cylinder 28 and the pintle 51, i.e., $d_e = d_2 - d_1$.

For a pintle of 3 inches diameter which leaves a one inch annular gap in a 5 inch internal diameter tube, $h_c = 38.4$ b.t.u./sq. ft./hr./° F., and, for a four inch plug, leaving an annular gap of 0.5 inch, $h_c = 70.5$ b.t.u./hr./sq. ft./° F. With a 4.5 inch diameter plug, leaving an annular gap of only 0.25 inch, $h_c = 343$ b.t.u./hr./sq. ft./° F. The required heat may be transferred to the graphite from the hot gas in this way provided a small gap is maintained.

From the above discussion, it is clear that any physical device which decreases the cross-sectional area is appropriate. The practical requirement is that the pintle survive the heat of operation of the light source. Refractory materials, such as graphite which has a melting point of 6600° F., are particularly appropriate. Since the refractory tube light source can sustain very high temperatures it may be seen that the use of the pintle is valuable since it is instrumental in providing the desired high temperatures. Another form of pintle which may advantageously be used within chamber 28 and whose effect is comparable to that of pintle 51 is disclosed and claimed in the copending application of Stanley Lehrer filed of even date herewith and of common assignee, entitled Steady Intensity Incadescent Light Source. The pintle of that invention may be a hollow graphite rod with a multiplicity of perforations forming apertures in its wall to provide communicating between the inside of the pintle, wherein the burning gases are introduced, and the outside. The axes of the apertures are angled to provide a component of gas flow toward the exhaust end of the combustion chamber. The result of the functioning of the perforated pintle is effectively the same as that of pintle 51 for analogous although not literally the same reasons.

Figure 6:
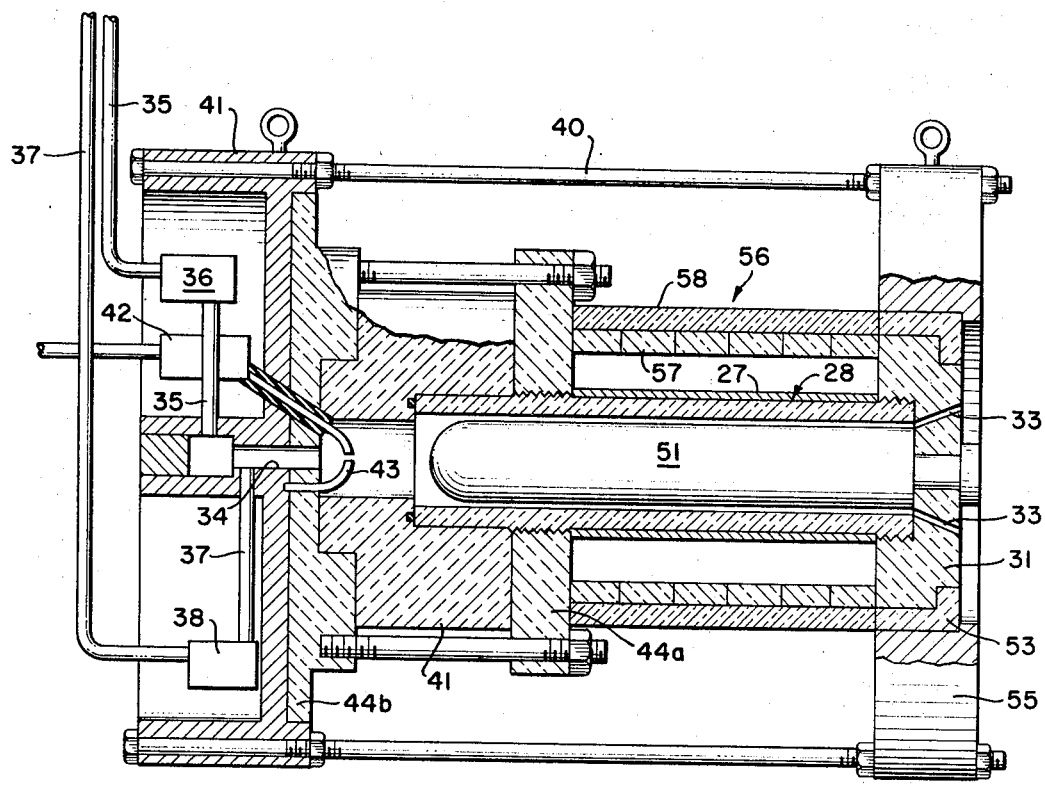
FIG. 6 is a modification of the invention as shown in FIG. 5.

The operation of the light source of FIG. 5, with or without the material 27, may diminish in output intensity as a consequence of oxidation either of the discrete emitter material 27, or if it is not used, of the outside graphite surface itself of tube 28. This may be avoided by encompassing tube 28 by a transparent envelope construction 56 of fused quartz or sapphire such as that shown in either of the above mentioned copending application of Stanley Lehrer and illustrated here in FIG. 6. Although the unitary transparent tube of the Fleishman and Evans application may be used for this purpose the segmented transparent tube construction comprising series of annular rings 57 within a unitary transparent tube 58 of the Stanley Lehrer application is highly effective in coping with thermally induced strain. This is particularly appropriate in view of the extraordinarily high operating temperatures achieved by the light source of the instant invention.

The foregoing disclosure and drawings are merely illustrative of the principles of this invention and are not to be interpreted in a limiting sense.

What I claim as my invention, is:

1. A high intensity light source with opaque portions adapted for mounting on and operation from an airborne vehicle for illumination of a large land area beneath the airborne vehicle, comprising:
    (a) a hollow cylinder of refractory material opaque to visible radiation;
    (b) a source of fluid fuel and a source of fluid oxidizer mounted within said vehicle;
    (c) means for feeding the fuel and oxidizer fluids from said sources into said cylinder and burning them therein to raise the cylinder to its incandescent temperature; and
    (d) means mounting said cylinder during its illumination operation relative to said vehicle and said area to be illuminated for ensuring the absence of oqaque portions of said light source between said cylinder and said area to be illuminated.

2. A light source as recited in claim 1 wherein said cylinder is graphite and has an outside surface comprising discrete spectral emissivity enhancing material in the visible region when said cylinder is heated to incandescence.

3. A light source as recited in claim 1 including an envelope of refractory material transparent to visible radiation surrounding and coaxial with said opaque cylinder.

4. A light source as recited in claim 3 wherein said transparent envelope is segmented to withstand thermal strain.

5. A light source as recited in claim 2 including an envelope of refractory material transparent to visible radiation surrounding and coaxial with said opaque cylinder.

6. A light source as recited in claim 5 wherein said transparent envelope is segmented to withstand thermal strain.

7. A light source as recited in claim 1 including a graphite pintle disposed within and coaxial with said opaque cylinder.

8. A high intensity light source, comprising: an outermost envelope of material opaque to visible radiation forming a combustion chamber; said outermost envelope having an outside surface including discrete emitter material; and means utilizing burning gases flowing inside said opaque envelope for raising the temperature of said opaque envelope to incandescense.

9. A light source as recited in claim 8 wherein said envelope is a hollow graphite cylinder.

10. A light source as recited in claim 8 wherein said temperature raising means includes a graphite pintle within said envelope.

11. A light source as recited in claim 8 wherein said discrete emitter material emits in the visible region of the spectrum.

12. A light source as recited in claim 9 wherein said discrete emitter material is coated on said graphite cylinder.

13. A light source as recited in claim 9 wherein said discrete material impregnates the outside surface of said graphite cylinder.

14. A high intensity light source, comprising: an outermost envelope of material opaque to visible radiation forming a tubular combustion chamber; means for introducing burning gases into said chamber; and a pintle mounted within and coaxial with said combustion chamber.

15. A light source as recited in claim 14 wherein said opaque material and said pintle are of graphite.

References Cited

UNITED STATES PATENTS

| | | | |
|---|---|---|---|
| 288,281 | 11/1883 | Warne | 314—22 |
| 904,627 | 11/1908 | Lovekin | 122—156 |
| 2,849,860 | 9/1958 | Lowe. | |
| 3,141,741 | 7/1964 | Hoel et al. | 431—4 X |
| 3,393,967 | 7/1968 | Fleishman et al. | 431—158 |

EDWARD G. FAVORS, Primary Examiner

U.S. Cl. X.R.

110—97; 431—4, 347